(12) United States Patent
Satou

(10) Patent No.: US 10,429,682 B2
(45) Date of Patent: Oct. 1, 2019

(54) SUPPORT FOR PANEL DEVICES IN AN ELECTRONIC DISPLAY DEVICE

(71) Applicant: Panasonic Liquid Crystal Display Co., Ltd., Himeji-shi, Hyogo (JP)

(72) Inventor: Takeki Satou, Hyogo (JP)

(73) Assignee: Panasonic Liquid Crystal Display Co., Ltd., Hyogo (JP)

(*) Notice: Subject to any disclaimer, the term of this patent is extended or adjusted under 35 U.S.C. 154(b) by 0 days.

(21) Appl. No.: 15/476,363

(22) Filed: Mar. 31, 2017

(65) Prior Publication Data

US 2018/0284526 A1    Oct. 4, 2018

(51) Int. Cl.
*G02F 1/1333* (2006.01)
*G02F 1/1335* (2006.01)

(52) U.S. Cl.
CPC .............. *G02F 1/133308* (2013.01); *G02F 2001/13332* (2013.01); *G02F 2001/133317* (2013.01); *G02F 2001/133354* (2013.01); *G02F 2201/46* (2013.01)

(58) Field of Classification Search
CPC ... G02F 1/133308; G02F 2001/133354; G02F 2201/46; G02F 2001/13332; G02F 2001/133317; G02F 1/13338; G02F 1/133504; G02F 1/133608; G02F 2001/133311; G02F 2001/133314; G02F 2001/133322; G02F 2001/133325; G02F 2001/133328; G02F 2001/133331; G02F 2001/133334

USPC .................................................... 349/58–60
See application file for complete search history.

(56) References Cited

U.S. PATENT DOCUMENTS

| | | | |
|---|---|---|---|
| 8,416,149 B2 | 4/2013 | Evanicky | |
| 8,917,252 B2 | 12/2014 | Kuriki | |
| 2006/0125745 A1 | 6/2006 | Evanicky | |
| 2008/0239195 A1* | 10/2008 | Nishio | G02F 1/133308 349/58 |
| 2009/0140121 A1* | 6/2009 | Fujikawa | G02F 1/133308 248/544 |
| 2009/0153768 A1* | 6/2009 | Ooami | G02F 1/133308 349/58 |
| 2010/0045889 A1* | 2/2010 | Yuan | F16B 5/0642 349/58 |
| 2011/0141405 A1* | 6/2011 | Kitagawa | G02F 1/133504 349/74 |
| 2012/0162880 A1* | 6/2012 | Yoon | H04N 5/64 361/679.01 |
| 2012/0312677 A1 | 12/2012 | Kuriki | |
| 2013/0100370 A1* | 4/2013 | Chen | G02F 1/133308 349/58 |
| 2013/0164479 A1* | 6/2013 | Lo | B32B 3/06 428/53 |
| 2015/0068884 A1 | 3/2015 | Kuriki | |

(Continued)

*Primary Examiner* — Shan Liu
(74) *Attorney, Agent, or Firm* — Hamre, Schumann, Mueller & Larson, P.C.

(57) ABSTRACT

An electronic display device including two or more panel devices and a support structure for supporting the two or more panel devices. The support structure includes a support member for each panel device and the support members being stacked in a thickness direction. The support members are separate pieces. Each support member has a support surface being configured to contact an edge of a corresponding panel device.

11 Claims, 8 Drawing Sheets

(56) References Cited

U.S. PATENT DOCUMENTS

| | | | |
|---|---|---|---|
| 2015/0324043 A1* | 11/2015 | Yoshikawa | G02F 1/133308 345/173 |
| 2016/0054613 A1* | 2/2016 | Lee | G02F 1/133308 362/97.2 |
| 2016/0083173 A1* | 3/2016 | Chen | B65D 21/0213 206/454 |
| 2016/0131831 A1* | 5/2016 | Tomomasa | G02B 6/0031 348/790 |
| 2016/0170702 A1 | 6/2016 | Jiang et al. | |
| 2016/0306480 A1* | 10/2016 | Park | G06F 3/041 |

* cited by examiner

SUPPORT FOR PANEL DEVICES IN AN ELECTRONIC DISPLAY DEVICE

FIELD

This disclosure relates to electronic display devices for displaying an image that require two or more panel devices.

BACKGROUND

Many flat electronic display devices that display an image (e.g., televisions, monitors, cellular telephones, tablets, etc.) require two or more panel devices. Each panel device in a display device may be a touch sensitive panel device, a liquid crystal display ("LCD") panel device, a light emitting diode ("LED") panel device, an organic light emitting diode ("OLED") panel device, or other such panel devices. An electronic display device may provide a support for positioning and supporting the panel devices within the electronic display device.

BRIEF SUMMARY

An electronic display device having two or more panel devices has a support structure that supports each panel device in the electronic display device. The support structure has support members and each support member has at least one support surface for contacting and supporting an edge of a panel device. The support members are stacked in a thickness direction and positioned to contact a corresponding panel device before being secured to a support portion or frame.

In an embodiment, an electronic display device includes a support portion, a first panel device and a second panel device affixed together in a thickness direction, and a support structure that is secured to the support portion and located at the edge of the stacked first panel device and second panel device. The support structure includes a first support member and a second support member that are separate pieces. The first support member has a first support surface that is parallel to and configured to contact an edge of the first panel device. The second support member has a second support surface that is parallel to and configured to contact the second panel device.

In some embodiments of the electronic display device, the first and second support members are corner supports that are located at the corner of the stacked device panels. The first corner support member has a third support surface that is parallel and configured to contact the edge of the first panel device, and the second corner support having a fourth support surface that is parallel to and configured to contact the edge of the second panel device.

BRIEF DESCRIPTION OF THE DRAWINGS

Both described and other features, aspects, and advantages of a support structure and an electronic display device will be better understood with reference to the following drawings.

Like reference numbers represent like parts throughout.

DETAILED DESCRIPTION

Figure 1:
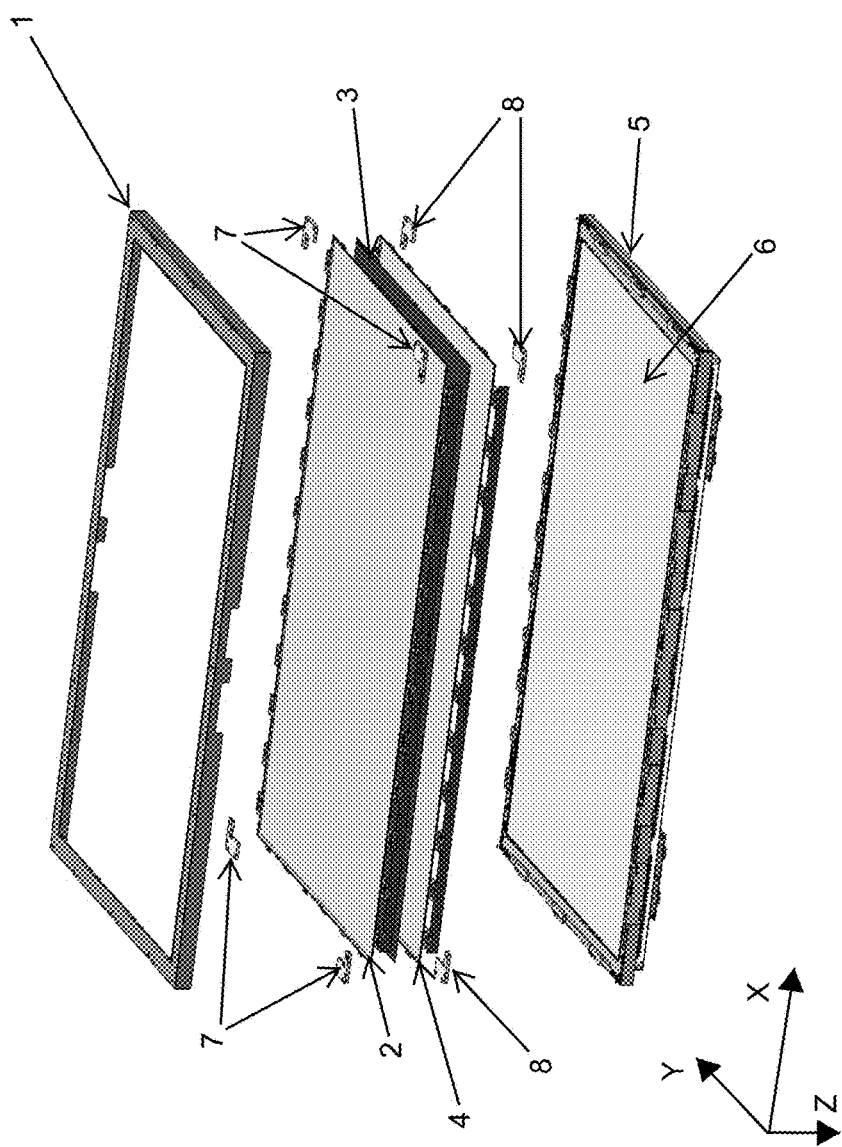
FIG. 1 shows an exploded view of an embodiment of a liquid crystal display ("LCD") electronic display device.

Electronic display devices are assembled by stacking two or more panel devices in the viewing direction of the electronic display device. Each panel device may itself be composed of multiple layers, such as a pair of substrates sandwiching a liquid crystal layer in the case of a liquid crystal display as a panel device. The stacked panel devices also include an adhesive between the stacked panel devices to affix the panel devices together. Affixing the panel devices together ensures that the contacting surfaces of each panel device completely and correctly contact each other, but it also means the panel devices cannot be moved independently from each other. When affixed together, the edges of each panel device in the electronic display device are not aligned perfectly. One of a variety of factors (e.g., manufacturing tolerances, movement of a panel device after the initial positioning, etc.) may cause this misalignment. Accordingly, the edge of one panel device will protrude farther outward then the other panel device, or panel devices, in the stacked configuration.

The device panels in an electronic display device are supported by a support structure. The support structure is located at the edge of the stack of panel devices and supports the panel devices in one or more directions that are perpendicular to the viewing direction of the electronic display device. In previous electronic display devices, the support structure supports the panel devices by having a single support surface that is parallel to the edges of the stacked panel devices and is perpendicular to the display surface of the electronic display device. The support structure's support surface is positioned to contact the edge of the stack of panel devices, but due to the panel devices not being perfectly aligned, the support surface cannot contact the edge of each panel device. For example, a support surface of a support structure in an electronic display device having two panel devices will only contact and support one panel device, and a support surface of a support structure in an electronic display device having three panel devices will, at most, only contact two panel devices. In a case where the support structure is supporting two panel devices in a direction for supporting the weight of the panel devices, the edge of one panel device will be forced to support the weight of both panel devices. The extra force on the panel device supporting the weight can cause cracks in a glass substrate of the panel device, deterioration of the displayed image due to internal pressures, or other structural or image quality problems. When the support structure supports the panel devices on a non-weight bearing edge, other structural or image quality problems may also occur. For example, the gap between the edge of a panel device and the support may allow a panel device to shift or move from its correct position.

Embodiments described in this specification address the problem described above. Embodiments of an electronic display device may include a support structure that supports the stacked panel devices. A support structure in such embodiments may have multiple support members, and each support member supporting each individual panel device. One or more support members may individually support each panel device in one or more directions. An advantage of the embodiments disclosed is the support of each panel device individually. One advantage of this is that the edge of a single panel device does not have to support the weight of the other panel devices.

FIG. 1 shows an exploded view of an embodiment of a liquid crystal display ("LCD") electronic display device. The LCD electronic display device includes an upper frame 1, a first LCD panel device 2, a diffuser 3, a second LCD panel device 4, a middle frame 5, and a backlight 6. The LCD electronic display device also includes four first support members 7 configured to support the first LCD panel device 2, and four (one not shown) second support members 8 configured to support the second LCD panel device 4. When fully assembled, the first LCD panel device 2 and second LCD panel device 4 are affixed together. The stacked LCD panel 2, 4 devices may include additional materials between the affixed LCD panel devices 2, 4. For example, the diffuser 3 in the form of a sheet or layer may be included between the affixed LCD panel devices 2, 4.

The first support members 7 are L-shaped support members. Each of the first support members 7 is located at a corner of the first LCD panel device 7. When assembled, the first support members 7 are affixed to the middle frame 5 such that first support members 7 support the first LCD panel device 2 in both the X direction and the Y direction. The second support members 8 are also L-shaped support members. Each of the second support members 8 is located at a corner of the second LCD panel device 4. When assembled, the second set of support members 8 are affixed to the middle frame 5 and support the second LCD panel device 4 in the X and Y directions. When assembled, each first support member 7 is stacked on a second support member 8 in the thickness direction to form a support structure at each corner of the stacked LCD panel devices 2, 4. Specific embodiments of the support members 7, 8 and their structure and attachment are described in detail below. The embodiment shown in FIG. 1 uses L-shaped support members 7, 8, but other embodiments may employ other types of support members 7, 8 or support structures in alternative or in addition to the L-shaped support members 7, 8 described. The embodiment shown in FIG. 1 utilizes four support members 7, 8 for each LCD panel device 2, 4, but other embodiments may utilize one or more support members 7, 8 for each LCD panel device 2, 4. The illustrated embodiment includes two LCD panel devices 2, 4, but other embodiments may include more than two panel devices, different types of panel devices, or a combination thereof of panel devices. Embodiments having more than two panel devices would also include corresponding additional sets of support members.

Figure 2A:
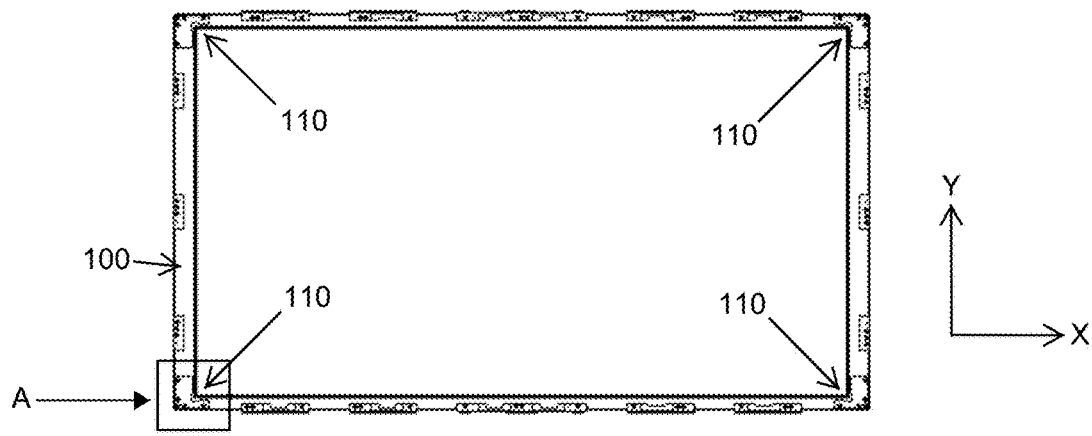
FIG. 2A shows an embodiment of a support frame for supporting panel devices in an LCD electronic display device.

An embodiment of a support frame 100 in an LCD electronic display device is shown in FIGS. 2A-3B. FIGS. 2A and 2B show the support frame 100 without the other components of the LCD electronic display device. When the LCD electronic display device is assembled, the stack of panel devices is inserted within the support frame 100. The support frame 100 may be a separate frame as in FIG. 2, or in some embodiments it may be a frame shaped support (described below, for example, in the description for FIGS. 6 and 8) that is secured to one or more support portions. Other embodiments may alternatively secure support structures 110, or other such support structures, to support portions located near corners or an edge of the stacked panel devices.

FIG. 2A shows an embodiment of a support frame 100 having L-shaped support structures 110 located at the corners of the support frame 100. While this embodiment has L-shaped support structures 110 at the corners, it should be understood that other embodiments may employ one or more rectangular support structures (described below) at the horizontal edge, vertical edge, or at or near the corners of the support frame 100.

FIGS. 2B-5B show embodiments of L-shaped support structures for one corner of the support frame 100, but it should be understood that other L-shaped support structures may be similarly constructed and configured for the other corners.

Figure 2B:
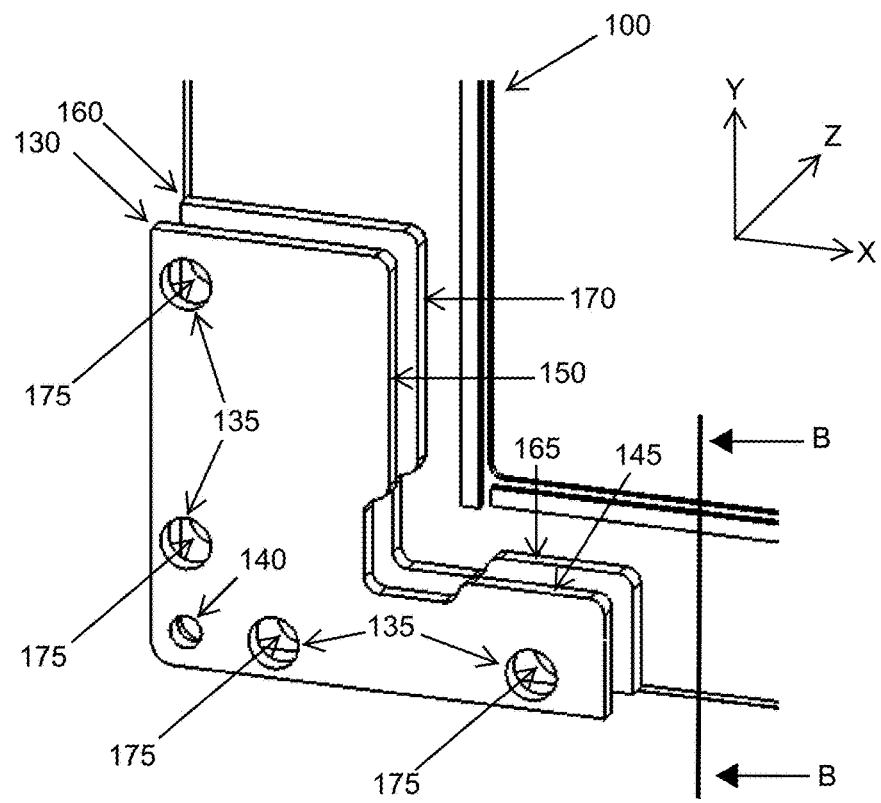
FIG. 2B shows an embodiment of an L-shaped support structure in an LCD electronic display device.

FIG. 2B shows the L-shaped support structure 110 from viewpoint A in FIG. 2A before the support structure 110 is affixed to the support frame 100. As shown in FIG. 2B, an embodiment of the L-shaped support structure 110 has a first support member 130 and a second support member 160. The first support member 130 and second support member 160 are separate pieces as each support member 130, 160 is an individual component that has been singularly formed or constructed. As each support member 130, 160 is a separate piece, one support member 130, 160 can be moved without requiring the other support member 130, 160 to be moved. Depending upon the embodiment, this may also allow one support member 130, 160 to be secured without requiring the other support member 130, 160 to be already correctly positioned as each support member 130, 160 is separately secured. The first support member 130 includes a first support surface 145 and a second support surface 150 for supporting a first LCD panel device (not shown in FIG. 2B). The second support member 160 includes a first support surface 165 and second support surface 170 for supporting a second LCD panel device (not shown in FIG. 2B). In other embodiments, each support member 130, 160 may include more than one surface along the edge of the panel device for supporting a respective LCD panel device in the X direction or the Y direction.

The first support member 130 also includes securing holes 135 that allow the first support member 130 to be secured to the support frame 100. Embodiments of the securing holes 135 for the first support member 130 and through-holes 175 (partially obscured) for the second support member 160 are described in more detail below. The securing holes 135 and through-holes 175 allow each support member 130, 160 to be positioned independently before being secured to the support frame 100. The securing holes 135 and through-holes 175 have a configuration that allows each support member 130, 160 to be secured in a position where the support surfaces 145, 150, 165, 170 of each support member 130, 160 contacts its respective LCD panel device. In an embodiment, the securing holes 135 and through-holes 175 may have a similar configuration. However, many embodiments will have through-holes 175 with a slightly larger diameter or length than the securing holes 135 to account for a non-alignment of the support members 130, 160. A securing hole 135 may also have inset portion as described below to allow a screw or other securing device to be countersunk.

Embodiments of the support members 130, 160 may also include an outer frame through-hole 140 (not shown for the second support member 160) for securing an outer frame (e.g., the upper frame 1 shown in FIG. 1, etc.) to a support frame 100 or a support portion.

Figure 3A:
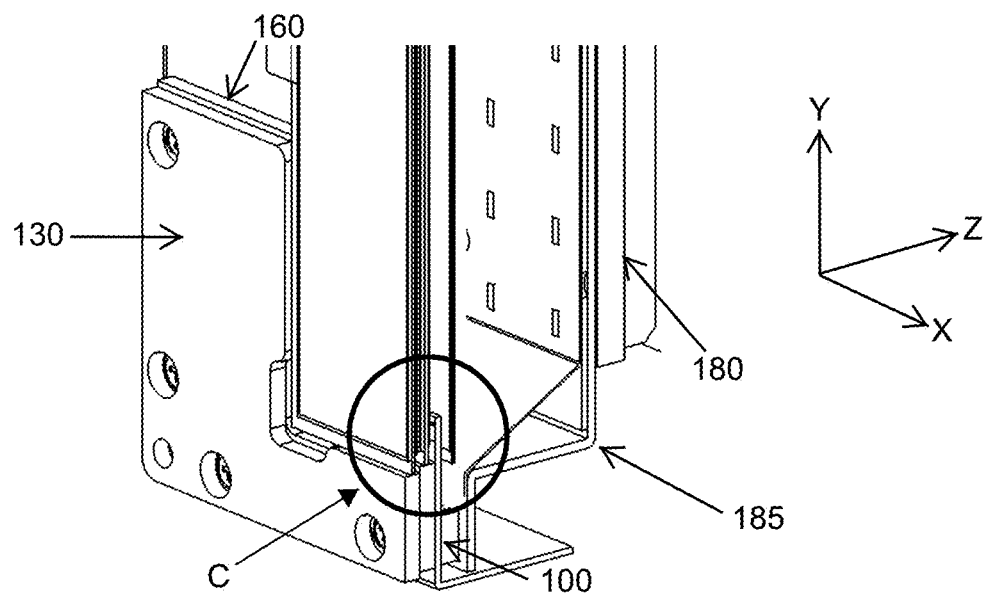
FIGS. 3A and 3B show cross sectional views of an embodiment of an LCD electronic display device that includes an L-shaped support structure.
Figure 3B:
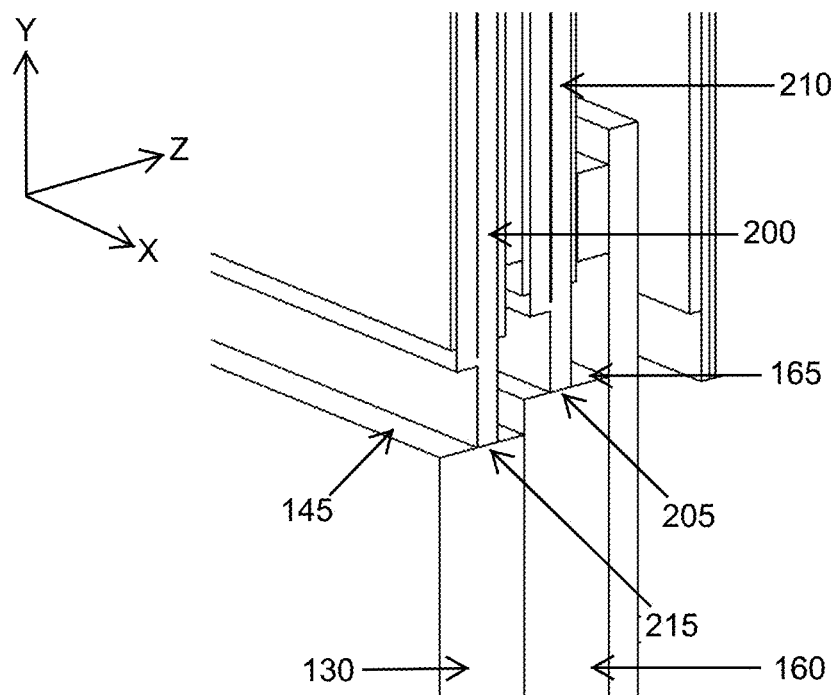

FIG. 3A shows an embodiment of an assembled LCD electronic display device from the cross sectional view B-B shown in FIG. 2B. FIG. 3B is an enlarged view of the area C shown in FIG. 3A. FIGS. 3A and 3B show the LCD electronic display device before an outer frame has been affixed to the LCD electronic display device. FIG. 3A shows the first support member 130 and second support member 160 of an embodiment of a L-shaped support structure 110 affixed to the support frame 100. The LCD electronic display device also includes a backlight 180 and back plate 185 that are attached to the support frame 100.

The embodiment of the LCD electronic display device includes a first LCD panel device 200 and second LCD panel device 210 affixed together in the Z direction. The first LCD panel device 200 has an outer edge 215 and the second LCD panel device 210 has an outer edge 205. The configuration of the L-shaped support structure 110 allows each support member 130, 160 of the L-shaped support structure 110 to be moved independently and secured in a position where the first support surface 145 contacts the outer edge 215 of the first LCD panel device 200 and the second support surface 165 contacts the outer edge 205 of the second LCD panel device 210. As the L-shaped support structure 110 can contact and independently support the edges 205, 215 of each LCD panel device 200, 210, the LCD panel device edges 205, 215 do not have to support an additional LCD panel device. While not shown here, the other support surface 150, 170 of each support members 130, 160 (shown in FIG. 2B) would also support corresponding edges of the LCD panel devices 200, 210 in the X direction in a similar manner, but in the X direction, as shown in and described above for the support surfaces 145, 165 in FIG. 3B.

Figure 4A:
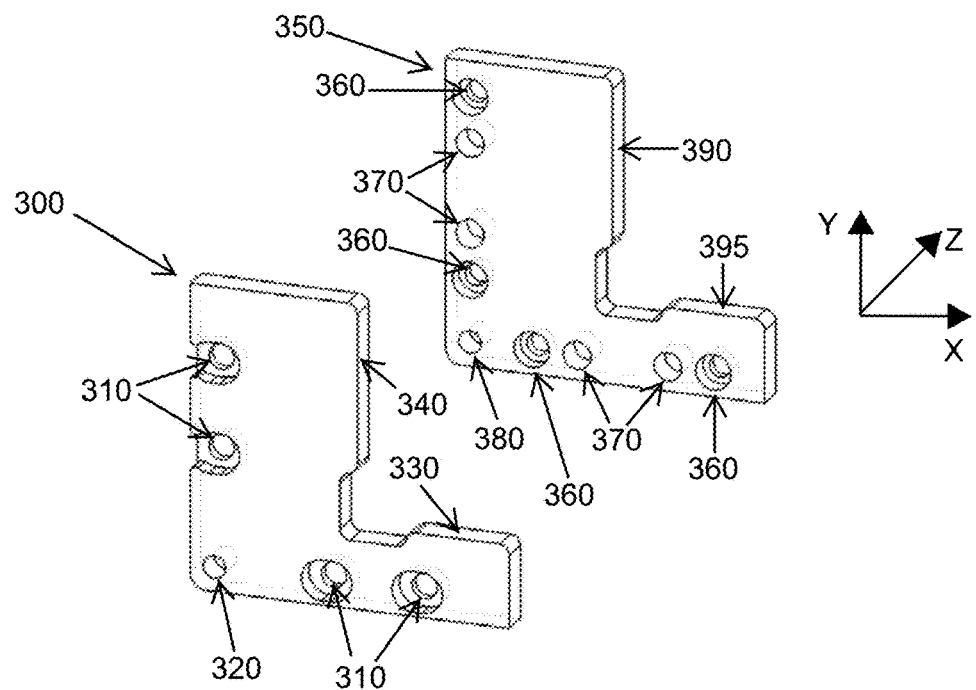
FIGS. 4A and 4B show the support members of an embodiment of an L-shaped support structure for an electronic display device.
Figure 4B:
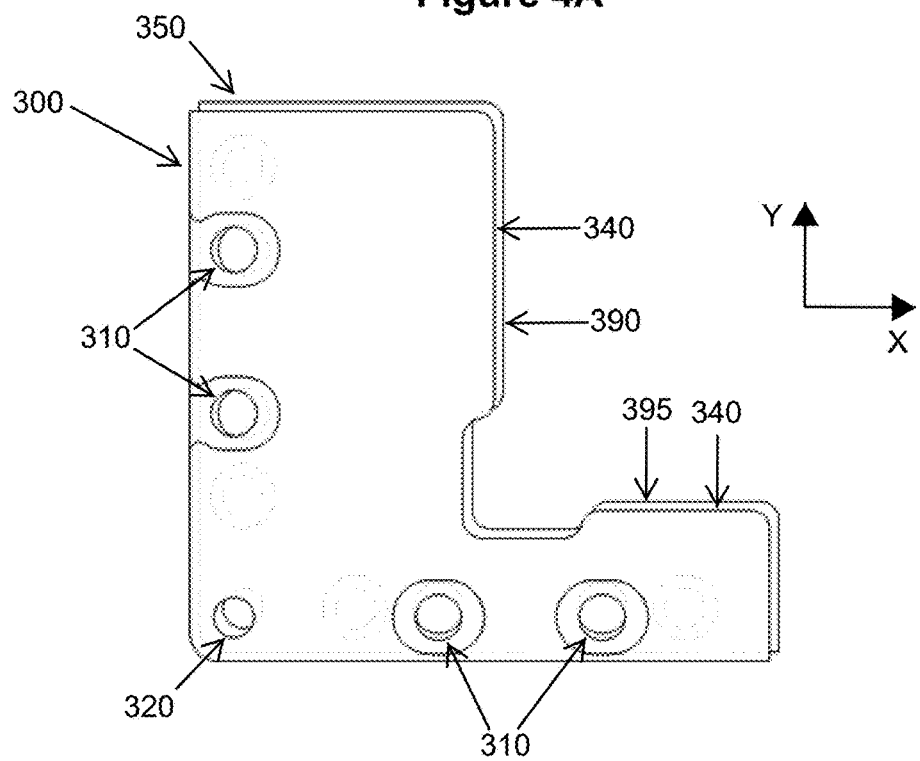

An embodiment of an L-shaped support structure is shown in FIGS. 4A and 4B. The L-shaped support structure in this embodiment has a first support member 300 and a second support member 350. FIG. 4A shows the first support member 300 and second support member 350 as independent components. This configuration, along with securing features described below, of the L-shaped support structure allows each support member 300, 350 to be independently secured to a support frame or a support portion.

Referring to FIG. 4A, the second support member 350 includes securing holes 360, through-holes 370, an outer frame through-hole 380, and support surfaces 390, 395. Each support surface 390, 395 is configured to contact and support a second panel device (not shown) in either the X direction or the Y direction (depending upon the specific corner the support member 350 is located) in a similar manner as described above for FIGS. 2A-3B. As shown in FIG. 4A, the second support member 350 also includes an inset portion 365 around each securing hole 360. These inset areas 365 provide an area for a screw head to be countersunk to secure the second support 350 to a support frame or support portion so that the second support member 350 presents a generally flat outward surface upon which the first support member 300 can be stacked (as shown in FIG. 4B).

The first support member 300 includes securing holes 310, an outer frame through-hole 320, and support surfaces 330, 340. Each support surface 330, 340 is configured to contact and support a first panel device (not shown) in either the X direction or the Y direction in a similar manner as described above for FIGS. 2A-3B. The first support member 300 also includes inset portions 315 around each securing hole 310. These inset portions 315 provide an area for a screw head to be countersunk to secure the first support member 300 to a support frame or support portion so that the first support member 300 presents a generally flat outward surface for placing an outer frame of the electronic display device (e.g., upper frame 1 in FIG. 1, etc.).

The support members 300, 350 shown in FIGS. 4A and 4B are assembled to a support frame or support portion to form the L-shaped support structure in the following manner. First, the stacked panel devices are placed within a support frame or near support portions as required to correctly position the panel devices within the electronic display device. Once the stacked panel devices have been positioned correctly within a support frame or near a support portion, the second support member 350 is placed at a corner of the second panel device in a position where each support surface 390, 395 contacts a corresponding edge of the first panel device. Once positioned as such, screws (not shown) are inserted through the securing holes 360 to secure the second support member 350 to a support frame or support portion. Once the second support member 350 is secured, the first support member 300 is stacked upon the second support member 350 in the Z direction (shown in FIG. 4B). The first support member 300 is then positioned so that each of its support surfaces 330, 340 contacts a first panel device (not shown).

As the affixed first panel device and second panel device are not aligned perfectly, the support members 300, 350 will also not be aligned in the X direction, Y direction, or both, as shown in FIG. 4B. Once the first support member 300 is in a correct position, it is secured to the support frame or support portion using screws (not shown here) inserted into the securing holes 310 and through the through-holes 370 of the second support member 350. As shown in FIG. 4B, the through-holes 370 of the second support member 350 overlap with the securing holes 310 of the first support member 300. This allows the screws to secure the first support member 300 directly to the support frame or support portion. The through-holes 370 may be slightly larger than the securing holes 310 of the first member 300 to account for the first securing member 300 and second securing member 350 not being aligned. The larger through-hole 370 ensures the through-hole 370 has a large enough diameter for a screw when the two support members 300, 350 are not aligned in the X direction, Y direction, or both.

When independently secured, each support member 300, 350 cannot be easily moved from its correct position because the screws create a pressure between the support members 300, 350 or a support member 350 and the support frame or support portion. This pressure and a frictional resistance between the support members 300, 350 or the support member 350 and the support frame or support portion prevent each support member 300, 350 from moving relative to the support frame or support portion. In some embodiments, a shaft that extends from the head of the screw (not shown) may be approximately the diameter as their corresponding securing hole 310, 360. In such an embodiment, the shaft of the screws may help prevent the support member 300, 350 from moving in the X and Y directions relative to the support frame or support portion.

The support members 300, 350 shown have the same shape, but in other embodiments the first support member 300 and second support member 350 may having different shapes. Other embodiments may also combine different types of support members, such as one or more rectangular support members (described below) in a support structure.

Such an embodiment may use one or more rectangular support members instead of the first support member 300 or second support member 350. The embodiment of the L-shaped support structure shown in FIGS. 4A and 4B includes four securing holes 310, 360 for securing each support member 300, 350, but no specific number of securing holes 310, 360 is required. The L-shaped support structure will preferably have at least one securing hole 310, 360 in each support member 300, 350. The number of through-holes 370 in the second support member 300 will depend upon the number of securing holes 360 in the other support member or members. Embodiments that independently secure each support member 300, 350 (as shown in FIGS. 4A and 4B) and have more than two panel devices may include through-holes 370 in each support member 300, 350 that correspond to each securing hole 310, 360 of each support member 350 stacked upon it.

Figure 5A:
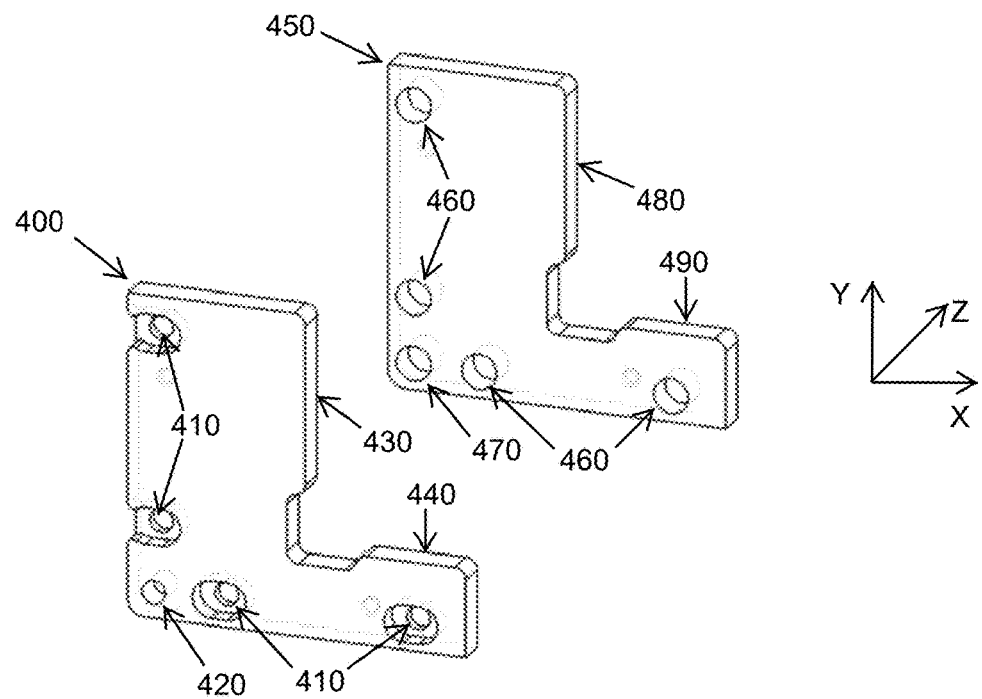
FIGS. 5A and 5B show support members of a second embodiment of an L-shaped support structure for an electronic display device.
Figure 5B:
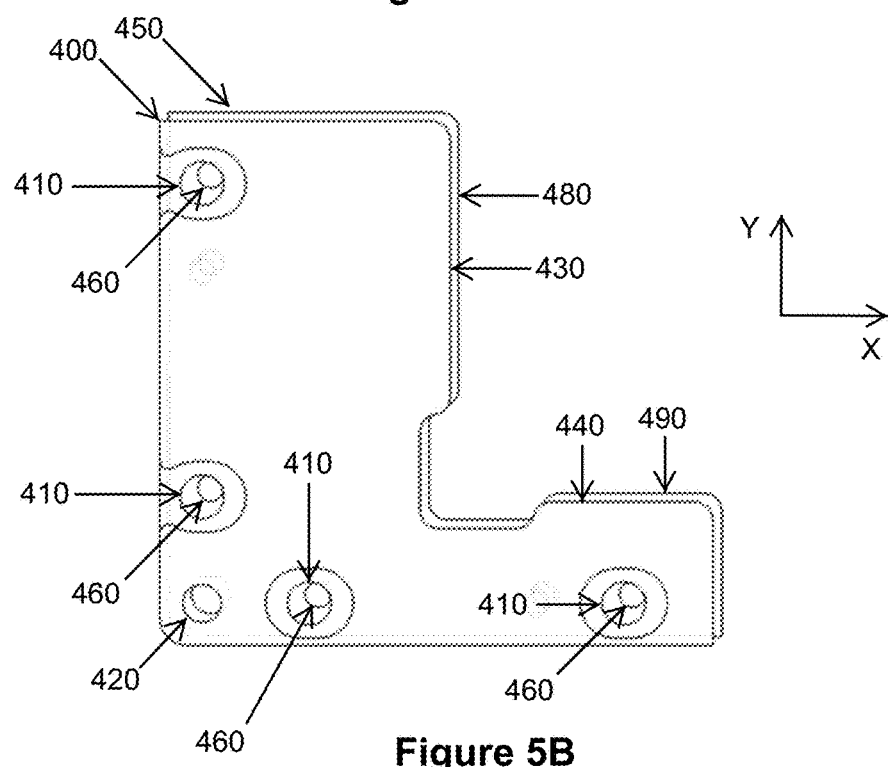

A second embodiment of an L-shaped support structure for an electronic display device is shown in FIGS. 5A and 5B. The L-shaped support structure in this embodiment has a first support member 400 and a second support member 450. In this embodiment of the L-shaped support structure, the second support member 450 is secured to a support frame or support portion by the first support member 400. It should be understood that secured means that the support member cannot change its position relative to its corresponding panel device. FIG. 4A shows the support members 400, 450 as independent components. The first support member 400 has securing holes 410, an outer frame through-hole 420, and support surfaces 430, 440. As previously described for L-shaped support structures, each support surface 430, 440 is configured to contact and support a first panel device (not shown here) in either the X direction or the Y direction. The first support member 400 may also include an inset portion 415 around each securing hole 410 as shown in FIGS. 5A and 5B. Each inset portion 415 allows a screw to be countersunk to secure the support members 400, 450 to a support frame or support portion so that the support member 400 has a generally flat outward surface for an outer frame (e.g., upper frame 1 shown in FIG. 1, etc.).

The second support member 450 has through-holes 460, an outer frame through-hole 470, and support surfaces 480, 490. As described above, each support surface 480, 490 is configured to contact and support a second panel device (not shown here) in either the X direction or the Y direction. In this embodiment, the second support member 450 does not have securing holes to independently secure the second support member 450 to a support frame or support portion.

FIG. 5B shows the first support member 400 and second support member 450 stacked in a Z direction and positioned such that each support surface 430, 440, 480, 490 contacts a corresponding edge of a first panel device or second panel device (not shown here). The Z direction would be perpendicular to the Y direction and the X direction. When in this position, the securing holes 410 of the first support member 400 overlap with the through-holes 460 of the second support member 450. As the first support member 400 and second support member 450 may not be perfectly aligned (for example, as shown in FIG. 5B), the through-holes 460 of the second member 450 in some embodiments may be larger than the securing holes 410 of the first member. The overlap or partial overlap of the through-holes 460 and securing holes 410 allows a screw or other securing device to pass through the through-holes 460 to secure the first support member 400 directly to a support frame or support portion.

As identified above, the second support member 450 is not independently secured to a support frame or support portion in this embodiment. When being assembled, the support members 400, 450 are stacked and each support member moved in the X direction and Y direction such that each support surface 430, 440, 480, 490 contacts a corresponding edge of a first panel device or second panel device (not shown here). Once positioned, the first securing member 400 and second securing member 450 are secured to a support portion or support frame using screws inserted through the securing holes 410 and through-holes 460. The second support member 450 is secured in its position as it is pinched between first support member 400 and the support. In an embodiment, the friction and pressure between the first support member 400 and second support member 450 and the second support member 450 and the support frame, support portion, or other spacing device prevents the second support member 450 from moving out of position.

The embodiments of an L-shaped support structure described above show four securing holes 410 and corresponding through-holes 460, but other embodiments may only include one or more securing holes 410 and corresponding through-holes 460. Other embodiments may also utilize a perforated or thinner material instead of through-holes or securing holes. The securing method, such as screws, may then puncture through the material to secure one or more support members. Other embodiments may configure a material to be punctured without requiring thinning or perforation; in such an embodiment, the screws or other securing device would then fully penetrate one or more support members to secure the one or more support members to a support frame or support portion. Some embodiments may also secure a support member to another support member instead of a support frame or support portion. Other embodiments may utilize other securing devices such as pins, bolts, or clamps to secure the support members.

Figure 6:
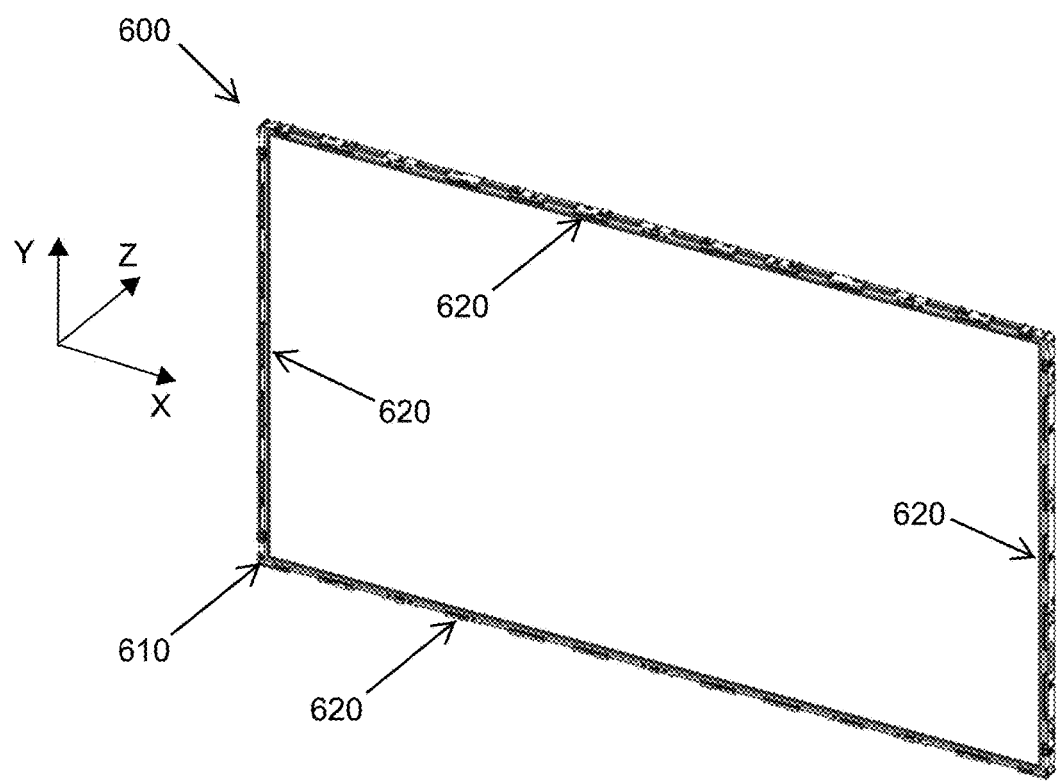
FIG. 6 shows an embodiment of a frame shaped support.
Figure 7:
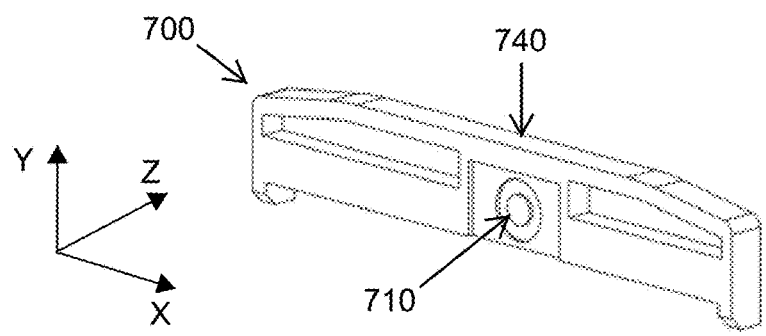
FIG. 7 shows an embodiment of a rectangular support member.

Shown in FIGS. 6 and 7 are embodiments of other types of support structure or support members that may be used in addition to, or in place of, the L-shaped support structure or L-shaped support members. FIG. 6 shows an embodiment of a frame shaped support 600. The frame shaped support in this embodiment goes around the entire edge of the stack of panel devices (not shown here). The frame shaped support 600 may include L-shaped support members 610 and rectangular support members 620 (described below) having support surfaces that support a panel device in an X direction, Y direction, or both. The frame shaped support 600 may be secured to a support frame or a support portion. Support members, such as the L-shaped support members 610 and rectangular support members 620 as described herein, may then be secured to the frame shaped support 600 to support each additional panel device in the electronic display device. In other embodiments, the frame shaped support 600 may not support a panel device but instead the frame shaped support 600 may be utilized as a support for the support structures in the electronic display device. Depending upon the particular embodiment, a support type frame 600 in some embodiments may be similar to the support frame 100 shown in FIG. 2 or it may be secured to support portions.

FIG. 7 shows an embodiment of a rectangular support member 700. The rectangular support member 700 includes a support surface 740 for supporting a panel device in an electronic display device. The support surface 740 is configured and utilized in a similar manner to a single support surface 145, 165 of the L-shaped support member 130, 160 of the L-shaped support structure 110 as described above.

The rectangular support member 700 also includes a securing hole 710 that allows the rectangular support member 700 to be secured to a support frame, a support portion, or another support member 700.

Figure 8:
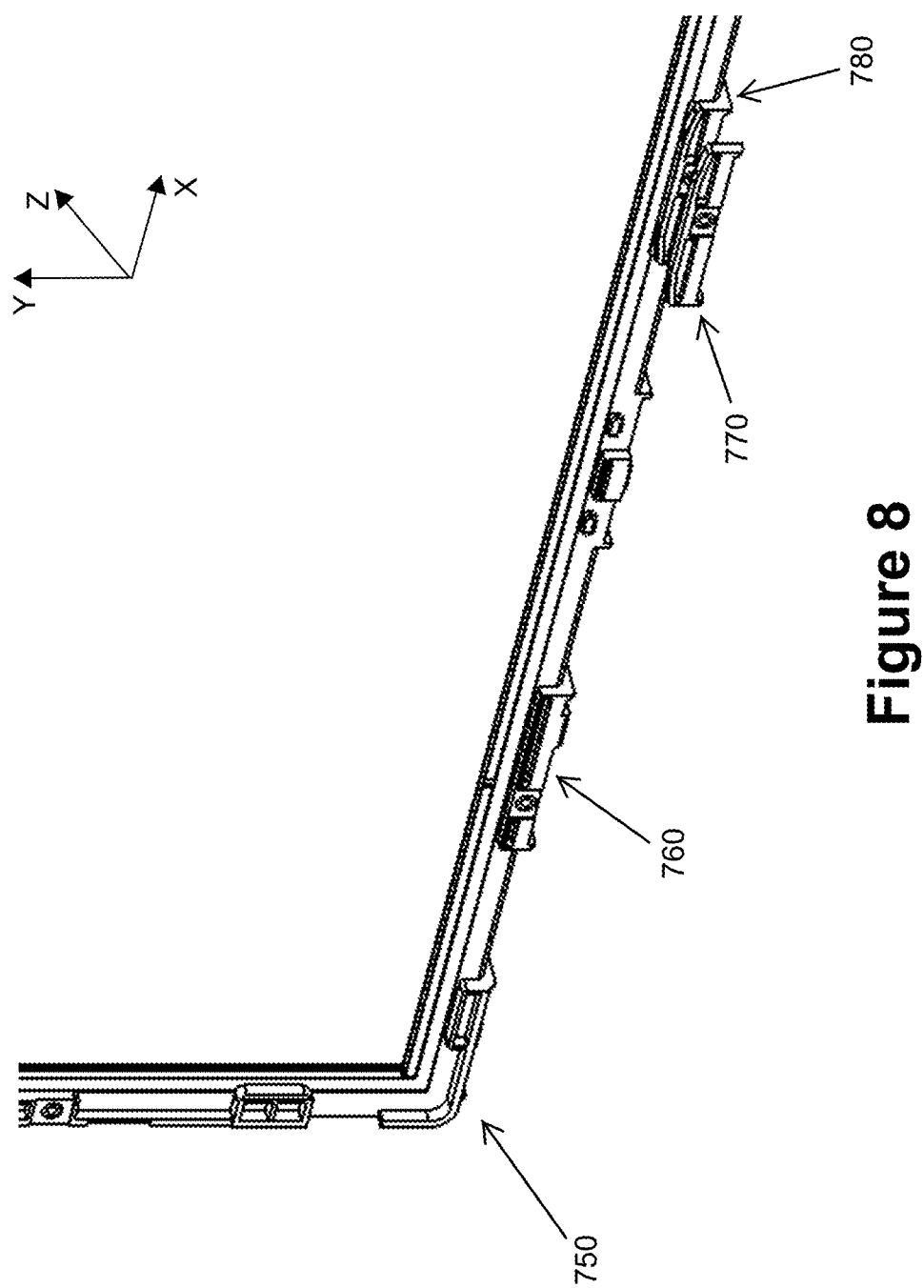
FIG. 8 shows an embodiment of a support frame including rectangular support members.

FIG. 8 shows a partial view of an embodiment of a support frame 750 that includes support members 760, 770, 780. The support frame 750, in an embodiment, may be secured to a support portion (not shown). The support members 760, 770, 780 are rectangular support members. The support frame 750 may include rectangular support members 780, 760 for supporting a first panel device (not shown here) that are integrated with support frame 750. Accordingly, the support frame 750 and rectangular support structures 760, 780 are formed as a single piece. FIG. 8 shows how a second support member 770 for supporting a second panel device (not shown here) may be secured to the first support member 780 and support frame 750.

In the embodiment shown in FIG. 8, the support members 760, 780 for supporting a first panel device (not shown here) are integrated with the support frame 750. The rectangular support member 770 is a separate piece that is stacked on the integrated support member 780 in the Z direction and can be moved independently in the Y direction before being secured. As the support member 770 is independently moveable, it can be positioned so that its support surface 740 (shown in detail in FIG. 7) contacts and supports a corresponding panel device (not shown here). Once correctly positioned, the second support member 770 may then be secured to the first support member 780 and the support frame 750 by a screw inserted through a securing hole 710 (shown in detail in FIG. 7) in the second support member 770. When assembled, the support frame 750 will include support members 760, 770, 780 that each contact a respective edge of a first or second panel device (not shown) and support the panel devices in the Y direction.

The embodiments of the rectangular support members 760, 770, 780 in FIGS. 6-8 have a single securing hole 710, but other embodiments of rectangular support members 760, 770, 780 may have more than one securing hole 710. Depending upon the structure of the integrated support member 760, 780 in an embodiment, the support member 770 or support members (in embodiments with more than two panel devices) may be secured to an integrated support member 760 or to a different part of the support frame 750. If the support member 770 or members is supported to the support frame 750, the securing hole 710 in the support member 780, in an embodiment, may be a through-hole, as previously described. Such a through-hole may be larger than the securing hole 710 of the support member 770 to accommodate for the support members 770, 780 not being aligned. In some embodiments, the second support member 770 may be secured to the first support member 780 or to both the first support member 780 and the support frame 750. In an embodiment, the support member 780 may not have a securing hole 710, but instead it may have solid portion or a perforated portion, thinner portion, or other modified portion for a screw or other securing device to puncture so as to secure the second support member 770. In embodiments with more than two panel devices, each rectangular support member 760, 770, 780 may include through-holes for each support member it has stacked upon it. In such embodiments, each additional support member can be independently secured to the support frame 750 or support portion, in a similar manner to the support structure and support members 300, 350 shown in FIGS. 4A and 4B. In embodiments that secure the support member 770 or members to the integrated support member 760, 780, the integrated support members 760, 780 would not have such through-holes.

The embodiment illustrated in FIG. 8 does not include L-shaped support members or L-shaped support structures, but other embodiments may also include one or more L-shaped support members or L-shaped support structures located at the corners of the support frame 750. In other embodiments, the rectangular support structure or rectangular support members 760, 770, 780 may be located at or near the corners of the support frame 750. An embodiment may also utilize the rectangular support members 760, 770, 780 at the corners of the support frame 750 such that they abut or nearly abut. In some embodiments, multiple rectangular support members 700, 760, 770, 780, may be configured to have support surfaces 740 that are facing approximately perpendicular to each other, such that the support surfaces 740 may support the edges of a single panel device (not shown here) near the corner of the panel device similar to the L-shaped support members. In such a manner, multiple perpendicular rectangular support structures may be used to support two or more panel devices (not shown here) near their corners.

Figure 9:
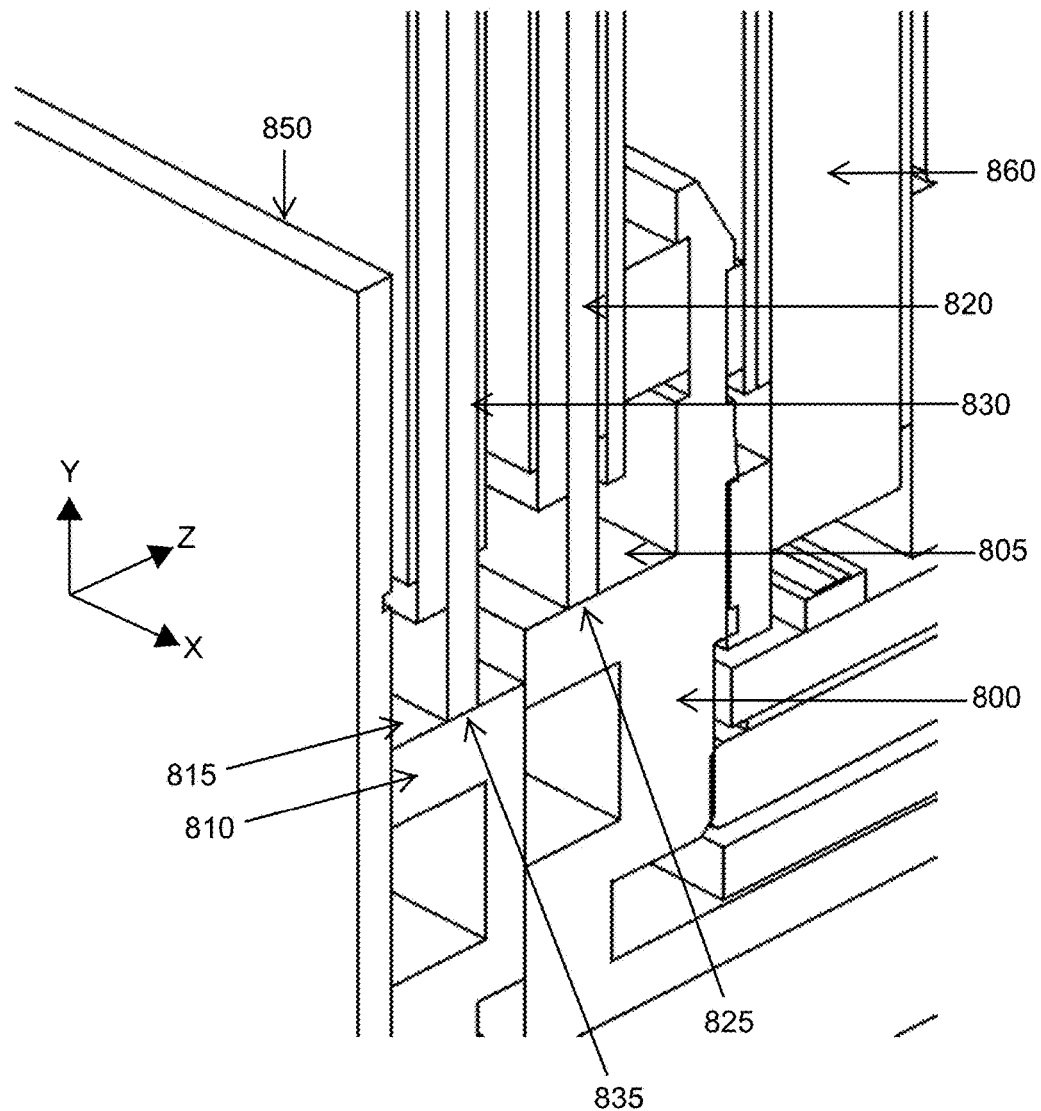
FIG. 9 shows an embodiment of a rectangular support structure in an LCD electronic display device.

FIG. 9 shows a prospective, cross sectional view of an embodiment of a rectangular support structure in an assembled LCD electronic display device. The rectangular support structure in an embodiment includes a first support member 800 and a second support member 810. The first support member 800 is integrated into a support frame, as similarly shown and described for the support frame 750 and support members 760, 780 in FIG. 8. The LCD electronic display device also includes an outer frame 850 (e.g., the upper frame 1 shown in FIG. 1, etc.) and a backlight 860.

An embodiment of an LCD electronic display device includes a first LCD display panel 820 and a second LCD display panel 830 affixed together in a stacked configuration in the Z direction. The first LCD display panel 820 has an outer edge 825 and the second LCD display panel 830 has an outer edge 835. The rectangular support structure has a configuration such that it can independently support the outer edge 825, 835 of each LCD display panel 820, 830. The first support member 800 has a support surface 805 that contacts and supports the outer edge 825 of the first LCD display panel 820. As the first support member 800 is integrated into the support frame, the support frame and the first support member 800 are formed as a singular piece. The second support member 810 has a support surface 815 that contacts and supports the outer edge 835 of the second LCD display panel 830. The second support member 810 is a separate piece from the first support member 800, such that it can be independently moved in the Y direction. The Y direction is a direction that is perpendicular to the length of the outer edge 835 of the second display panel 830. As such, the second support member 810 is an independent piece from the first support member 800 and can be independently moved into contact with the outer edge of 835 of the second LCD display panel 830 and secured to the second support member 800.

When the LCD electronic display device is being assembled, the affixed LCD panels 820, 830 may be first inserted into the support frame such that outer edge 825 of the first LCD display panel 820 contacts the support surface 805 of the first support member 800. After the first LCD display panel 820 and first support member 800 are correctly positioned as described, the second support member 810 may be positioned on first support member 800 in a stacked configuration in the Z direction as shown in FIG. 9. The second support member 810 is positioned such that its support surface 815 contacts the outer edge 835 of the second LCD display device 830. Once correctly positioned, the second support member 810 is then secured to the first support member 810 via a screw (not shown) or other securing device as similarly described for the first support member 770 in FIG. 8. In the manner described, the rectangular support structure may independently support the outer edge 825, 835 of each LCD display panel 820, 830. It should be understood that an embodiment of an LCD electronic display device may have one or more rectangular support structures along each outer edge of the affixed LCD display panels 820, 830, and the rectangular support structures, similar to the other support structures described above, may be located along the other outer edges 825, 835 of the affixed panels 820, 830 that face in the X and Y directions. It should also be understood that an embodiment of an L-shaped support structure, which has been described above, may include an integrated L-shaped support member similar to the integrated rectangular support members 760, 780, 800 shown and described.

The examples disclosed in this application are to be considered in all respects as illustrative and not limitative. The scope of the disclosure is indicated by the appended claims rather than the foregoing description, and all changes which come within the meaning and range of equivalency of the claims are intended to be embraced.

The invention claimed is:

1. An electronic display device, comprising:
   a support portion;
   a first panel device and a second panel device, the first panel device and the second panel device being stacked and affixed together in a thickness direction of the electronic display device; and
   a plurality of support structures, each of the support structures secured to the support portion and located at an edge of the stacked first and second panel devices, each of the support structures comprising a first support member and a second support member, wherein
   the first support member comprises a first support surface, the second support member comprises a second support surface, the first support surface being parallel to and configured to contact an edge of the first panel device, and the second support surface being parallel to and configured to contact an edge of the second panel device, and
   in each of the support structures, the first support member and the second support member of the support structure are separate pieces that contact each other and have the same shape.

2. The electronic display device of claim 1, wherein the first support member and the second support member in each of the support structures are configured to be independently adjustable such that each of the first support surface and the second support surface can be placed in contact with the respective edge of the first panel device or second panel device before being secured to the support portion.

3. The electronic display device of claim 1, wherein the support portion has a frame shape and is continuous around the outside of the edge of the stacked first and second panel devices.

4. The electronic display device of claim 1, wherein each of the support structures is secured to the support portion such that the first support member cannot move in a direction perpendicular to the edge of the first panel device contacted by the first support surface and the second support member cannot move in a direction perpendicular to the edge of the second panel device contacted by the second support surface.

5. The electronic display device of claim 1, wherein the first support member and the second support member in each of the support structures are stacked in a direction parallel to the thickness direction of the first and second panel devices.

6. The electronic display device of claim 1, wherein
   the first support member and the second support member are a first corner support member and a second corner support member, the first corner support member and the second corner support member located at a corner of one of the stacked first and second panel devices,
   the first corner support member and the second corner support member comprise a third support surface and a fourth support surface, respectively, the third support surface being parallel and configured to contact another edge of the first panel device, and the fourth support surface being parallel and configured to contact another edge of the second panel device,
   the edges of the first panel device corresponding to the first support surface and the third support surface of the first corner support member meet at the corner of the first panel device, and
   the edges of the second panel device corresponding to the second support surface and the fourth support surface of the second corner support member meet at the corner of the second panel device.

7. The electronic display device of claim 6, wherein the first and third support surfaces of the first corner support member are perpendicular to each other, and the second and fourth support surfaces of the second corner support member are perpendicular to each other.

8. The electronic display device of claim 1, wherein one of the support structures is secured to the support portion by a screw.

9. The electronic display device of claim 1, wherein the first support member and the second support member are independently secured to the support portion.

10. The electronic display device of claim 1, wherein both of the first and second panel devices are liquid crystal display type panel devices.

11. The electronic display device of claim 1, wherein one of the first and second panel devices is a touch sensitive input panel device.

* * * * *